United States Patent
Trifa et al.

(10) Patent No.: US 9,794,321 B2
(45) Date of Patent: Oct. 17, 2017

(54) SYSTEM, METHOD AND A TAG FOR MAPPING TAGGED OBJECTS TO CONTEXT-AWARE APPLICATIONS

(71) Applicant: EVRYTHNG Limited, London (GB)

(72) Inventors: Vlad Trifa, Zurich (CH); Dominique Guinard, Affoltern am Albis (CH); Niall Murphy, Commungny (CH)

(73) Assignee: EVRYTHNG Limited, London (GB)

( * ) Notice: Subject to any disclaimer, the term of this patent is extended or adjusted under 35 U.S.C. 154(b) by 568 days.

(21) Appl. No.: 14/095,603

(22) Filed: Dec. 3, 2013

(65) Prior Publication Data
US 2014/0181256 A1   Jun. 26, 2014

Related U.S. Application Data

(60) Provisional application No. 61/745,638, filed on Dec. 23, 2012.

(51) Int. Cl.
*G06F 15/16* (2006.01)
*H04L 29/08* (2006.01)

(52) U.S. Cl.
CPC ............ *H04L 67/02* (2013.01); *H04L 67/24* (2013.01); *H04L 67/2814* (2013.01); *H04L 67/327* (2013.01)

(58) Field of Classification Search
CPC ....... H04L 67/02; H04L 67/10; H04L 65/105; H04L 67/22; H04L 67/24; G06F 2221/2111
See application file for complete search history.

(56) References Cited

U.S. PATENT DOCUMENTS

2012/0284012 A1* 11/2012 Rodriguez ............ G06Q 30/06
704/1

OTHER PUBLICATIONS

USPTO, Non-Final Rejection in U.S. Appl. No. 14/457,103, dated Nov. 4, 2015.
USPTO, Final Rejection in U.S. Appl. No. 14/457,076, dated Jul. 26, 2016.

* cited by examiner

*Primary Examiner* — David Lazaro
(74) *Attorney, Agent, or Firm* — Siritzky Law, PLLC

(57) ABSTRACT

There is provide a computing system configured to receive an object identifier and contextual information from an end-user, to compute the object identifier and contextual information based on pre-defined set of rules, to map said object identifier and contextual information to an entry point associated with a specific computer application among a plurality of applications, and to provide access to said specific computer application to said end-user. There is also provided a method to do the same, and a tag for use with a physical object, the tag comprising a redirection identifier embodying a unique identifier of the object and an HTTP address of a server permitting to redirect or provide access to the user to a specific computer application about the object.

29 Claims, 9 Drawing Sheets

SYSTEM, METHOD AND A TAG FOR MAPPING TAGGED OBJECTS TO CONTEXT-AWARE APPLICATIONS

CROSS REFERENCE TO RELATED APPLICATION

The present application claims the benefit of U.S. Provisional Application No. 61/745,638, filed Dec. 23, 2012, which is incorporated herein by reference in its entirety.

FIELD OF THE INVENTION

The present invention relates generally to the field of context-aware computing or ubiquitous computing, and more particularly to a system, a method and a tag for mapping tagged objects to context-aware applications.

BACKGROUND OF THE INVENTION

In the last years, context-aware applications have become a common practice for developing mobile applications. Foursquare, Facebook, Yelp are only a few examples of such applications, and many more continue to appear daily. In general, context-aware applications follow the following models.

Model 1: A unique Web application hosted on a Web server, accessible over the Internet via one or several URLs, connects to the application database and displays the data to various clients (usually a mobile or desktop Web browser). Rendering of the application's view is done on the Server and is only displayed on the client.

Model 2: A unique native application (mobile or desktop) running on the user's computing device connects to the application database over the Internet and displays the data to various clients. The rendering of the application is done on the client device; only data is retrieved over the Internet.

However, the existing approaches to attach context-aware digital content to physical objects suffer from various limitations.

First, in existing approaches (both Case 1 & 2) the content is always delivered via a unique application, which means the run-time "behavior" of the application is contained and constrained within the application at design-time, and the only run-time dynamic behavior is on-the-fly rendering of generic content within the application. In Case 1, context-aware Web applications usually are a simple Web site that can capture the current location of the user using HTML5's Geolocation API if supported by the client browser, and is sent along with the request the server to fetch and display various content is served depending on the user location. A common example is a user accessing a digital mapping service such as google maps (for example he uses his phone to browse to http://maps.google.com), which will always display a map centered around the current location of the user (or simply any address typed in by the user), with a list of nearby services, such as restaurants, shops, etc. Because of this, adding new location-dependent information is always done within the same application template (users can extend the application by adding various new points of interest to the map). This means even though the content displayed varies according to the location, the application itself remains the same (maps.google.com always displays "just" maps). This prevents people from creating custom applications individually that deliver various behaviors for the single entry point (the source URL). This limits the creation highly interactive and interactive applications that can entirely change adapt the content to your location with minimal user intervention.

As an example of Case 1, context-aware applications on the Web are accessed using a single entry-point (usually their URL, e.g. http://foursquare.com), which will launch always, the same unique Web application. The context-aware information is always sent to the same application, and is used only to display diverse information within a single, uniform view.

In this case, there is only one single application that is associated with a given entry point (the source URL: foursquare.com), and the entire experience and behavior is entirely controlled by that application. In such applications, users can only import context-dependent information (for example a bar in my neighborhood) that will be displayed by the application uniformly. The behavior the user sees is always hard-coded within one application, therefore it is very difficult to add new behaviors without modifying the entire application. In many other situations (Case 2), the location-aware application takes the form of a mobile application that must be downloaded, installed, and run on the device. This means that all the behavior available within the application is constrained by a unique and uniform application and must be entirely hard-wired within the application at run-time, which makes it impossible for people to develop and run entirely independent, self-contained, autonomous "bits" of that application that can be triggered by the context of the application.

Second, in case 2 because the behavior is a unique application, the server must hardcode and support the handling of various contextual information available from the client accessing the request, therefore it requires a high coupling between the client application and the server applications, therefore maintaining consistency between across is very difficult as any changes in the server applications, requires all the clients to be updated accordingly to keep working as is currently the case. This makes it difficult to develop robust applications that work across various mobile and desktop platforms.

Third, the context-aware behaviour is usually limited to the location of the user as derived from various positioning systems available on the mobile phone (GPS coordinates). Other types of contextual information, such as the user, the time of the day, or the type of the device can only be sent to one unique target application that can adapt its content. However, this contextual information cannot be used to launch or trigger various, independent applications. This is because the entry point of a Web application (its URL usually) always corresponds to only one given application at any given time (it can be updated). In other words, the current model of Web and mobile applications enforce any one URL to always correspond to only one unique Web application.

Fourth, when the bootstrap URL is encoded into an Auto-ID tag such as a QR code or an NFC tag, and is physically attached to an object, it is not possible to modify the information of the Tag afterwards. Therefore dynamic reconfiguration of the digital action associated with the Tag is not possible unless a level of redirection is used. To allow the action associated with a Tag to change, a redirection service may be used, for example bit.ly. This allows for the creation of a permanent short URL on an intermediary proxy server, where the redirection can be changed at a later point. However, this solution design always maps the short URL to a unique target URL without any support for the context of when the short URI is scanned or read by the end user.

Anyone scanning the short URL as encoded in the Tag will be redirected to the exactly the same target URI. This materially limits the scope of application behavior that can be driven from the Tag.

SUMMARY OF THE INVENTION

It is an object of the present invention to eliminate the disadvantages of the prior art by providing a system, method and tag for mapping tagged objects to context-aware applications.

As a first aspect of the invention, there is provided a computing system configured to receive an object identifier and contextual information from an end-user, to compute the object identifier and contextual information based on pre-defined set of rules, to map the object identifier and contextual information to an entry point associated with a specific computer application among a plurality of applications, and to provide access to the specific computer application to the end-user.

Preferably, the system comprises a context-aware redirector server configured to be connected to a rules database storing the pre-defined set of rules, the context-aware redirector server having an address and being accessible remotely via a data network and configured to receive the object identifier and contextual information, to compute the object identifier and contextual information based on the pre-defined set of rules, to map the object identifier and contextual information to an entry point associated with a specific computer application among a plurality of applications, and to redirect the user automatically to the specific entry point.

Preferably, the system further comprises computer instructions encoded on a machine-readable storage medium, the computer instructions being configured to receive a redirection identifier encoding the object identifier and the context-aware redirector server address, to interpret the redirection identifier to separate the object identifier from the context-aware redirector server address, and to send through the data network the object identifier to the context-aware redirector server using the interpreted server address.

Preferably, the computer instructions are further configured to capture and transmit the contextual information to the context-aware redirector server.

Preferably, the computer instructions are configured to receive the redirection identifier from a scanning device.

Preferably, the computing system as claimed in claim 4, wherein the redirection identifier consists of at least one of a bar code, an alphanumeric code and a RFID tag and the scanning device is at least one of a bar code reader, a camera and a RFID reader respectively. The redirection identifier can consist of any type of identifier enabling to uniquely identify the object identifier and the server address.

Preferably, the machine-readable storage medium is embedded in a user device.

Preferably, the user device is a mobile phone device or a personal computer device, and wherein the computer instructions are further configured to provide access to the user to the specific application through a computer application stored on the user device.

Preferably, the point entry is a HTTP address or a RUN.

Preferably, the contextual information comprises at least one of the geographical location of the user device, the user's identity and the actual time the user device received the redirection identifier or sent the request to the context-aware redirector server, and wherein the computer instructions are further configured to automatically determine and transmit the contextual information to the context-aware redirector server. When the context-aware redirector server is further configured to automatically determine the contextual information, the contextual information can comprise at least one of the geographical location of the user device, the user's identify and the actual time the context-aware redirector server received the request from the user device. In this case, the computer instructions can be configured to read the local time, user ID and location of the scanning device and/or the user device and/or of the context-aware redirector server.

The system can also comprise a user interface connected to the context-aware redirector server for enabling the user to manually enter the object identifier and at least a part of the contextual information.

As a another aspect of the invention, the computing system as claimed in claim 1, wherein the system further comprises computer instructions encoded on a machine-readable storage medium, the computer instructions being configured to receive an object identifier and contextual information, to send a request to a rules database storing the pre-defined set of rules, to compute the object identifier and contextual information based on the pre-defined set of rules, to map the object identifier and contextual information to an entry point associated with a specific computer application among a plurality of applications, and to redirect the user automatically to the specific entry point.

As a further aspect of the invention, there is provided a tag for use with a physical object, the tag comprising a redirection identifier embodying a unique identifier of the object and an HTTP address of a server permitting to redirect or provide access to the user to a specific computer application about the object.

Preferably, the redirection identifier is a bar code. Preferably, the tag is an RFID tag or a NFC tag.

As a further aspect of the invention, there is provided a method of mapping tagged objects to context-aware applications, the method comprising:

associating a tag comprising a redirection identifier to the object, the redirection identifier comprising embodying a unique identifier of the object and an HTTP address of a context-aware server permitting to redirect or provide access to the user to a plurality of computer applications associated with the object;

receiving at the context aware server a request comprising the object identifier and contextual information from the user;

computing the object identifier and contextual information based on pre-defined rules; and as a function of the computing, mapping the object identifier and contextual information to an entry point associated with a specific computer application among the plurality of applications, and automatically redirecting or providing access to the user to the specific entry point.

The redirection identifier can be any type of identifier, including a visual identifier. For example, the redirection identifier can be an alphanumeric code, a 1D bar code, a 2D barcode, a data matrix, a RFID identifier and the like. There are various techniques to encode and decode data, which could be steganography and other visual patterns arrangements such as colors and shape. These identifiers can be read using an image recognition application which are generally configured to be loaded on a smart device such as a mobile device or a computer device and adapted to extract a serial number printed on a box for example. Any of these identifiers or visual arrangements can be used to encode the redirection identifier.

Preferably, the context-aware server is remote from the tag, and the request is sent through a data network. Preferably, the contextual information comprises at least one of the geographical location of the tag, the user's identify and the actual time the context-aware server received the request from the user device.

DETAILED DESCRIPTION OF THE INVENTION

Figure 1:
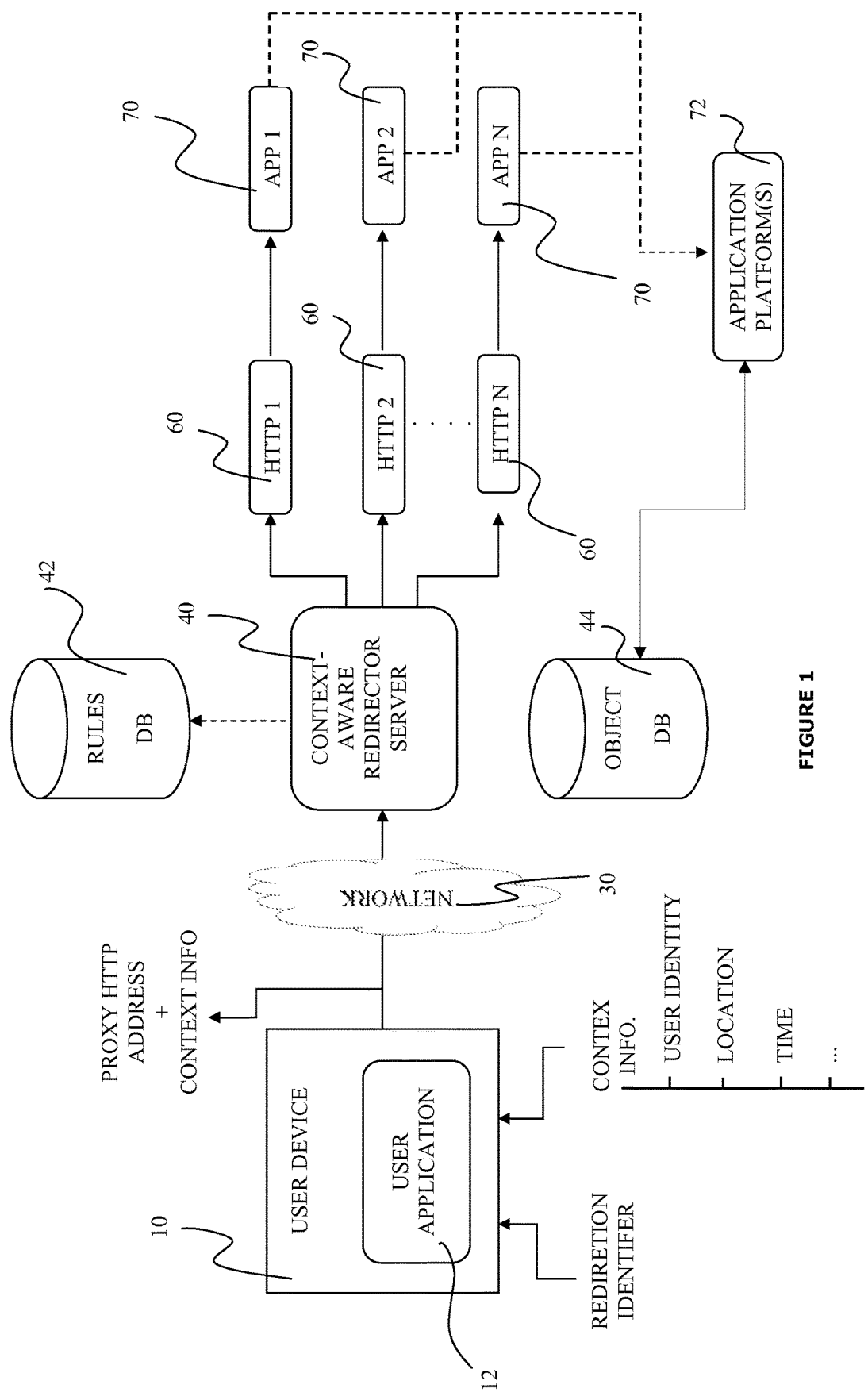
FIG. 1 illustrates a system for mapping tagged objects to context-aware applications in accordance with a first embodiment of the invention.
Figure 2:
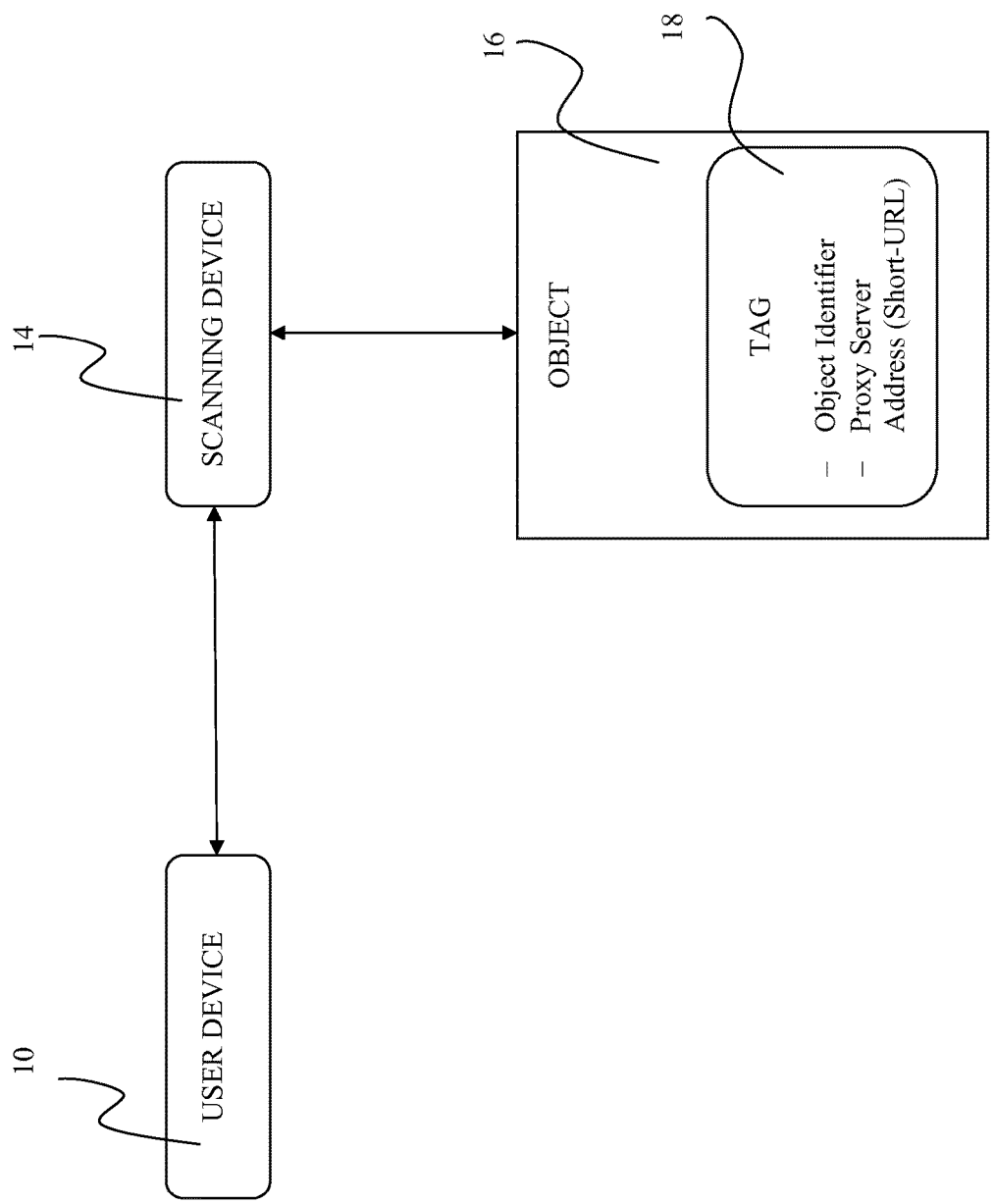
FIG. 2 illustrates the interaction between the user device and the object tag in accordance with the present invention.

As a first aspect of the invention, there is provided a system and method for mapping tagged objects to context-aware applications.

According to a first embodiment of the invention (See FIGS. 1 to 4), the system comprises a user application 12, a context-aware redirector server 40, a Rules Database 42, and run time application environments 60.

The user application 12 is configured to run on a user device 10 and to read a redirection identifier (object-address identifier) 18 comprising an object identifier identifying the object 16 and the address of the context-aware redirector server 40. The redirection identifier 18 can be any unique identifier such as an alphanumerical identifier, a bar code or any other type of identifier allowing to uniquely identifying the object and context-aware server. The redirection identifier 18 is preferably tagged on the object 16, and is scanned using a scanning device 14. The object can be any material or immaterial item or entity, such as a physical item, a location, an event, etc. In the first embodiment, the object is preferably a physical item on which the object-address identifier can be applied and eventually read. The scanning device depends on the type of the redirection identifier. The scanning device can for example be a camera (associated with the user's mobile device for example) when the redirection identifier is an alphanumerical code or a bar code reader when redirection identifier is a bar code.

The user application 12 (preferably a bootstrap application) is configured to read the redirection identifier and capture contextual information, to extract the address of the context aware redirector server 40 and to send an application request comprising the object identifier and the contextual information to the context aware redirector server 40 via a data network 30. Contextual information comprises preferably the user identity, the time and location where the request has been originated. The contextual information can basically include any other information.

The actual method on how the context information is retrieved depends very largely on the platform where the user application 12 runs.

In case where the user application 12 is a native application, the application can request various authorizations from the user (such as share his location with the application, some of his personal information such as address book contacts, or the phone number of the user, etc.) which can be used subsequently to derive context information to be transmitted to the redirector. Likewise, the user can authorize the application to access his location, so that every time he uses the application the GPS coordinates from the phone for example can be accessed and transmitted with every request from the native application. The same can be done to capture the time.

In case where the user application 12 is a Web application, cookies stored on the client's web browser can be used (the user can create a user account on the redirector server 40 (for example http://tn.gg), so every time he/she makes the request any URL on the redirector—e.g. http://tn.gg/abc123 which is encoded into a QR code—the redirector server 40 can retrieve his/her personal identification data from the cookie when he/she is logged into the redirector). This model can be further extended for when the user signs in the redirector application using a third party identity provider such as facebook, twitter, etc. Assuming the user creates an account using facebook, the redirector becomes effectively a facebook application, and by authorizing the redirector application to access his facebook account, every time the user will access the redirector server 40 (e.g. http://tn.gg/abc123) the redirector application will be able to know your facebook user identity (whether you *really* are that facebook user is another story, i.e. security issue for the application to trust that as I "could impersonate" you by copying your facebook cookie). The redirector server 40 can have access to the facebook session (or twitter, or . . . ) and know the username which can be bound to the user account on the redirector server 40 as long as the user is logged into that application and authorized it.

For the location of Web apps, it can be done by reverse geo coding the IP address (e.g. http://www.ip2location.com/), and in addition using the native or HTML5 API for respectively native and Web applications if allowed explicitly by the user.

To capture the time, though it can be done by the user application 12 at the user device 10, it is preferably computed by the redirector server 40 when it receives a request and that time is always in GMT time zone (the rules in the rules DB 42 are automatically converted into GMT time zone when they are created), otherwise users could just change their system time.

The context aware redirector server 40 is connected to the Rules DB 42 either locally or through a data network 30. The Rules DB comprises predefined rules mapping object identifiers and contextual information to run time application environments 60, which are preferably HTTP addresses of various applications 70.

The context aware redirector server 40 is a kind of a proxy server configured to be remotely connected through the data network 30 to the user bootstrap application 12 on the user's device 10 for receiving the application request, for inquiring the Rules DB as a function of the object identifier and contextual information, and as a function of the inquiry, for directing the request to a specific time application environment with a specific HTTP address triggering activation of a specific application. The context aware redirector server 40 is essentially a smart proxy server.

As an example, assuming a physical object, for example a photo camera of a specific brand and model, and with its unique serial number assigned by the manufacturer. Specific information about that particular camera (such as date of manufacture, identify of the party who has exercised quality control test and the location, etc.) could be stored within a unified centralized product database and can be read by other applications via authenticated API requests. This allows $3^{rd}$ party developers to create independent applications (or "behaviors") associated with that object and that can access the data about it to deliver specific services. For example, one application could help to find the closest repair centre for it, another application could be used to sign up for an anti-theft insurance policy with an insurance company, or yet another application simply could display basic information about that product.

According to this example, there can be provided applications as simple marketing campaigns for a given product, which are Web sites displaying multimedia content (text, videos, etc.) associated with the product that is customized for the location and moment when the content is accessed. In other terms, this means that a different Web site must be displayed for the same product depending on the country it has been accessed from.

A possible solution is to develop a single Web application that is localized to the various countries, but coordinating globally the independent requirements for each country, along with their respective legal constraints. However, this is a complex coordination exercise. Besides, every single change for any of the localized views would require the whole applications to be entirely updated, which could affect all the other countries.

Another possible solution will be for the various applications to be built independently, which means they will have to be individually installed on a mobile phone, or accessed over the Web via their respective URL. The only common point between them is only the same product information (database) being used. Because they all have their own individual bootstrap URL, currently this would require the packaging of the product to be adapted for each country so that the corresponding URL can be printed on each product. This might be a complex logistical operation because it requires the product to be entirely adapted for each country, and would require products to be physically modified in order to be adapted for another country or market.

According to the first embodiment of the present invention, the end user doesn't need to know the URLs of any of those applications, and even less to enter them manually on his mobile phone. The present invention can launch various applications associated with a physical product based on contextual information, without requiring physical intervention to the product, heavy coordination across various platforms, or manual intervention by the user.

As shown in FIGS. 1 to 4, the system in accordance with the first embodiment of the invention requires a unique object-address identifier to be attached with a physical product. Using the object-address identifier, a database (can be any database whose entries can be identified via any form of alphanumeric or other type of identifiers, for example a simple MySQL database) can be queried to obtain information about that product. The object-address identifier can be attached to the product using any Auto-ID technology.

The objective is to attach multiple target application URLs to a single source URL, where the target URL selection occurs according to a pre-defined set of redirection rules and the context from which the URL is accessed. In other words, that means that different users accessing exactly the same URL at exactly the same location and time will land on entirely different Web applications. Even if the same user accesses the same unique URL but at different time or from a different location, they could land on various, independent target URL, thus entirely different applications.

The present invention enables a dynamic mapping between a unique source URL and multiple target URLs, where the selection logic is entirely integrated into the Web (thus can be deployed today with no infrastructure changes required), and the redirections rules can be updated dynamically and flexibly at run-time without redeploying any Web application, nor require any client-side changes.

The main objective is to associate context-aware information and services to a physical object or location. In particular, this is to attach multiple services to a single physical object or place (a laptop, a shoe, a painting in a museum, etc.). The essential component and a bootstrap for attaching digital content to physical entity is a link in the physical world to the associated information in the digital world, which is usually a URL that is attached to the object. The URL could be directly printed on the object, but in order to facilitate automated identification of the object, there is proposed use of Auto-ID technology. Auto-ID has been emerging as an efficient technique to attach digital content to physical objects, and so that end users can use devices to access information and digital services associated with that object. Conventionally Auto-ID tags such as QR codes or NFC tags (for convenience's sake referred to in this document as "Tags" and referring to any technology that can encode a unique identifier) can encode various types of information such as a short text, a phone number, a URL, and even virtual card form (VCF).

As mentioned above, the system according to the first embodiment of the invention comprises a (1) a user application 12 configured to read a redirection (object-address) identifier which is preferably a unique short URL associated to an object and comprising the address of the context aware redirector server 40, (2) an Object Database 44 comprising information about objects, (3) a Rules Database 42 for storing object identifiers, contextual information and rules mapping these to specific application runtime environments 60, (4) multiple application runtime environments 60 linking to corresponding multiple independent applications (Web or native) which can access the object database 44, and (5) a context-aware redirector server that forwards any incoming request (comprising a source short URL) received from the user bootstrap application 12 to the multiple application runtime environments linking to multiple applications.

Short-URL Associated with an Object:

A unique Auto-ID tag is generated for each physical object, and the tag encodes a short-URL that uniquely corresponds to the physical object. A short-URL is simply a shorter URL that points to a context-aware redirector server 40 running on the Web. The short URL has the following format: http://[domain]/[short-ID], where the "domain" is any valid domain name for an Internet host, and the "short-ID" is an alphanumeric string of arbitrary length. Examples: http://tn.gg/abc123, http://au.di/SN1, http://abc/9lasdmfn.

The domain name always maps onto a context-aware redirector server. Several domains can point to the same context-aware redirector server or to different servers. The short-URL can be created using a request to a redirector service (the request can only be issued using a valid authentication credential) and by providing as parameter: (1) a default redirection URL (any URL in the Web) of an application, and (2) a desired short-ID that will be part of the short-URL. The actual ID ("long ID") that uniquely identifies the data associated to the physical entity within the common database.

Object Database:

The object database 44 can be any database that stores information about objects using unique identifiers (a unique key in database parlance, which is the "long ID" mentioned above). The Object Database 44 is used to index and store the various objects and to retrieve the related data the can be any type of information comprising technical specifications about the objects, date of manufacture, etc. In our examples, there has been used the EVRYTHNG™ engine (https://dev.evrythng.com), which is an online service that allows storing data corresponding to objects. Any other database such as MySQL and so on can be equivalently used.

Rules Database:

The Rules Database 42 is a database comprising pre-defined rules mapping object identifiers along with contextual information (e.g. user ID, location, time) to entry points for application runtime environments linking to corresponding different applications. The Rules Database can be updated dynamically by the database administrator.

Application Runtime Environments:

This component refers to entry points for one or multiple Web containers (for example Web servers) that allow hosting Web applications and serve any HTTP-compliant content, such as HTML pages, JSON documents, and other multimedia formats such as sound files, movies, executable JavaScript code, and so on. Each individual application can have a unique URL accessible publicly over the Internet that can be accessed and retrieved by the user. Furthermore, applications should accept and handle the passing as a parameter of the Long ID of an entity to be accessed. The application can then further interact with the common database and use the Long ID to retrieve the information stored about that unique physical product, and use that data in various ways such as processing or displaying it in various HTTP-friendly formats (MIME types). Each application can be deployed and maintained independently and can deliver one or more behaviors.

Context-Aware Redirector Server:

The context-aware redirector server 40 is essentially a Web-based proxy server configured to be connected to the Rules Database 42 for serving a large-quantity of short URLs and maintaining a mapping for each of them to multiple target URLs linking to the various entry points for the application rune time environments. The Rules Database 42 stores rules for each one of the short URL, where each rule points to a different target URL.

The redirecting proxy server 40 uses the Rules Database 42 to store the redirection rules in a table of key-value pairs, where several target URLs (value) can be associated to the same short URL+contextual parameters (the key). Preferably, the redirector implements a function $F(X)=Y$ such as for each incoming HTTP request (X) that points an existing short URL in the redirector will always be redirected (using HTTP redirects via the 3XX status codes of the HTTP protocol) to a unique target URL (Y). The actual input parameters X of the function $F(X)$ are a combination of the short URL (A) and a set of contextual parameters (B), for example such as username (b'), location (b''), and time (b'''). The function (F) of the redirector is then as follows $F(A,B)=F(A, b', b'', b''')=Y$.

As mentioned above, the first step is to create a unique short URL that will be associated (and preferably applied directly on) the physical object through a Tag, and set out in the Rules Database 42.

When creating any short URL, a "default" target URL must be given as parameter, which will be the target URL where the short URL will always redirect to (if no other rule matches the context).

An administrator (a user accredited to edit the dynamic behavior of the URL) can create a set of redirection rules, each one specifying a target URL where all the requests to the short URL that match a certain set of contextual criteria will be redirected to.

EXAMPLE

Contextual criteria may for example include (among others, and not restricted to): (1) a user identifier that is accessing the short URL (for example a social network identity), (2) a physical location identifier (for example GPS coordinates, name of a place, etc.), and (3) The time where the user has been accessing the object.

TABLE 1

| Short URL | User | Location | Time | Target URI |
|---|---|---|---|---|
| /coca | * | China | * | coca.cn |
| /coca | admin | China | * | coca.cn/admin |
| /coca | * | * | 25.12.2012 | coca.com/christmas_promo |
| /coca/[ID] | admin | * | * | coca.com/admin/[ID] |
| /coca/[ID] | * | China | * | coca.cn/[ID] |
| /coca/[ID] | * | UK | *.12.2012 | coca.co.uk/dec_prom/[ID] |

As the Table 1 illustrates, several rules can associate to the same source short URI. As a function of the user ID, location and/or time of request associated therewith, the target URI/URL assigned will vary. For example, a generic URL http://tn.gg/coca can be encoded in a Tag, and then several rules based on a location can be issued that redirect the same source short URL to different URLs based on the location where the Tag has been scanned. An application will then extract the URL and, if the application permits, the GPS coordinates of the user will be sent along in the request.

The redirector front-end will check the addition of additional parameters with the HTTP request. First it will check whether a user ID has been provided using the "Who:" HTTP header which is a text string that encodes the identity of the user who performs the request (which can be simply a username, an API key, or any other token), if no "User" header is found in the incoming request (that is the user has scanned the QR code using a generic QR scanner instead of a custom mobile app), the user variable will be set by default to "*" by the redirector to retrieve the generic rule associated with the QR code.

The redirector will then extract the location from the request using the "Where:" header, which is also a String. In this example if the short URL is accessed from a mobile application that can map the current GPS coordinates of the mobile device into the actual String used to describe locations in the redirection table, then it can encode the location directly using the header "Where:". Alternatively the redirection service can attempt to extract the location of the mobile device (either resolving the IP address of the phone to a country) or by displaying a HTML 5 web page that request access to the position of the phone and use it as location, if the location cannot be resolved, it will be set by default to "*".

Finally, the redirector will query the redirection table using the location, user identity, and the time at which the query has been received as query parameters, which will always return unambiguously a unique target URL (the default rule or the appropriate context driven URL).

User Application Bootstrap:

The user application bootstrap 12 can take a multiple of forms. As a first example, the user application bootstrap 12 is a specific native application configured to be used on the user's device 10 that is configured to be connected to a scanning device 14 for retrieving the address of the context-aware server 40 (Short-URL) once the redirection identifier 18 associated with the object 16 has been scanned by the scanning device 14. Once the application has decoded the address (Short-URL) of the context-aware redirector server 40 encoded in the redirection identifier, it simply accesses the Short-URL and transmits as appropriate the context information to the context-aware redirector server 40 (as described above using the "where:" and "who:" HTTP headers). This application is configured to carry out the redirection according to the HTTP standards and handle and display correctly the application running at the target URL (which can mean triggering another mobile application to be launched that can handle the target URL appropriately, or behave as an HTML browser).

The Short-URL will be redirected by the context-aware redirector server 40 depending on the object identifier and contextual information to a specific runtime application environment 60 linking to a specific application 70. The Web browser can then open the target URL of the application (e.g. Web application) that corresponds to the context according to the rules (if no rules match, it will be the default URL).

The scanning device can be a camera, a bar code reader, an RFID reader or any other scanning device adapted to the type of the tag encoding the redirection identifier 18 that has been used. The specific native application can also be configured to capture and transmit to the context-aware redirector server 40 contextual information, such as the current time and location of the object and the user's identity. For example, the native application can use an open-source library that allows reading QR codes using a camera of a mobile phone.

As a second example, the user application bootstrap 12 can be a generic application that runs on the user's device 10 and is configured to retrieve the Short-URL encoded in the Tag of the object. The encoded source Short-URL will then be accessed using a standard Web browser. As the Short-URL will be redirected by the context-aware redirector server 40 depending on the context, the Web browser will open the target URL of the Web application that corresponds to the context according to the rules (if no rules match, it will be the default URL).

Here, the contextual information can be captured by the context-aware redirector server 40 by tracing the IP address used to send the request. From the IP address, the location where the request has originated and the time of receipt of the request can be determined. The proxy server 40 can also be a simple HTML page, which can use HTML 5 Location API to capture the data and allow a login form in order to determine the user's identity (or use cookies to see if the user has logged into facebook, etc.).

According to this first embodiment, the redirection identifier 18 (e.g. QR-code) is associated to a physical object (item) and can be scanned by various people at different locations and/or times, and even if the URL encoded in the QR code is fixed, those various users might land on different applications, depending on their context.

The objective is that a single URL can point to various applications depending on context. For example, by typing http://www.buildings.com/room/heating in the web browser (e.g. Safari or Internet Explorer), a user (or different users) would automatically land on a different page depending on the building where they are located.

Example 2

This example takes the same example of the photo camera described above. An entry in the Object Database 44 and Rules Database 42 has to be created for that unique camera, which would contain data pertaining to the camera, which can be accessed by authorized by external applications. Various applications have been built to accesses the device data inside the databases 42 and 44, in particular:

(1) A public informational application, which is a web site that shows how to use the camera and take great pictures, built for various countries in their respective languages. These applications cannot access personal, private information about the camera, but only the data the manufacturer is willing to share openly with everyone.

(2) An internal admin application which can used only by the manufacturer to track and trace the location of a product and its status (information which is stored in the database but requires special credentials to be accessed). The internal application can be accessed only by authorized users (company employees) in some countries.

(3) A promotional timely application, which is only a video that describe a special offer for Christmas, where a free photo bag is offered when buying the camera in the UK the week before Christmas.

These three applications would be developed independently by various agencies without any coordination, they are hosted on the Web individually, therefore have their own URL and hosting.

A Short-URL is created in a context-aware redirector and various rules are created. The default rules are:

(1) When the Short-URL is accessed via an authenticated request by an authorized user from a permitted country only, then launch the internal admin application. Usually, in this case a company employee would launch a native mobile application where he can login with his personal credentials, which are then transmitted along with the request.

(2) When the Short-URL is accessed in the UK only during the week before Christmas, then launch the special promotional application (example.co.uk/Christmas).

(3) When the Short-URL is accessed in a given country without any credential, redirect to the application public informational application corresponding to that country (in Italy it could be example.it, in Singapore could be example.sg, etc.), and if no app corresponds to that country, launch the default application (example.com).

Once the Short-URL has been associated with the rules above, a QR code that encodes the Short-URL will be generated and then attached physically to the item.

The same QR code can then be scanned by anyone using any generic QR code scanner, which will trigger the Short-URL to be opened by the mobile Web browser. Depending on the context from which the country has been accessed, the redirector will point the browser to a matching context as described by the rules above.

Figure 3:
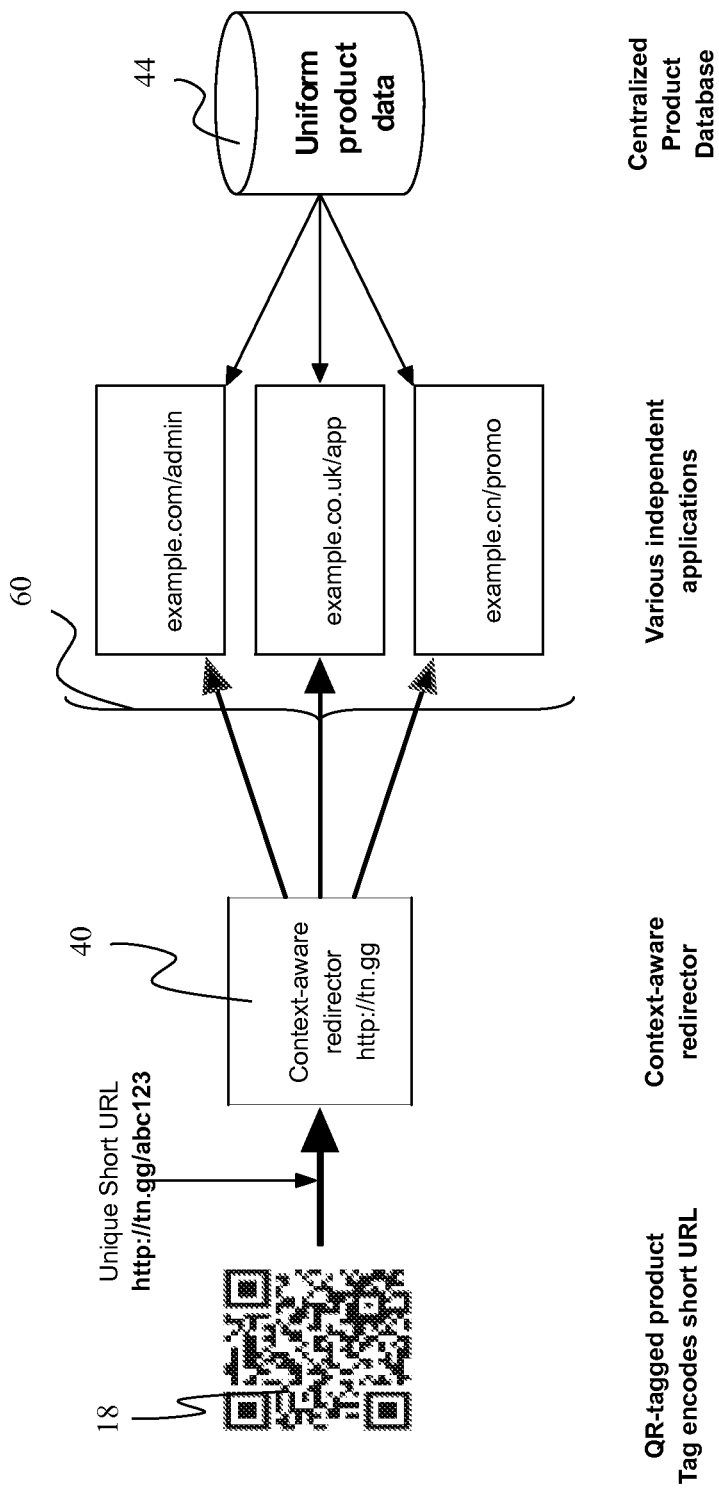
FIG. 3 illustrates use of a mobile phone to scan a QR code attached to a physical object using a generic 2D barcode scanner.

FIG. 3 A illustrates an example where a user uses his mobile phone to scan a QR code attached to a physical object using a generic 2D barcode scanner. The scanner will extract a short URL encoded in the QR code (in this example http://tn.gg/abc123) and open that URL in a browser window to display the Web page. Because the URL points to a private context-redirector service, anonymous information about the user (for example the geographic location as derived from the IP address of the client) is extracted and used to redirect the request to various independent applications residing at various URLs.

Figure 4:
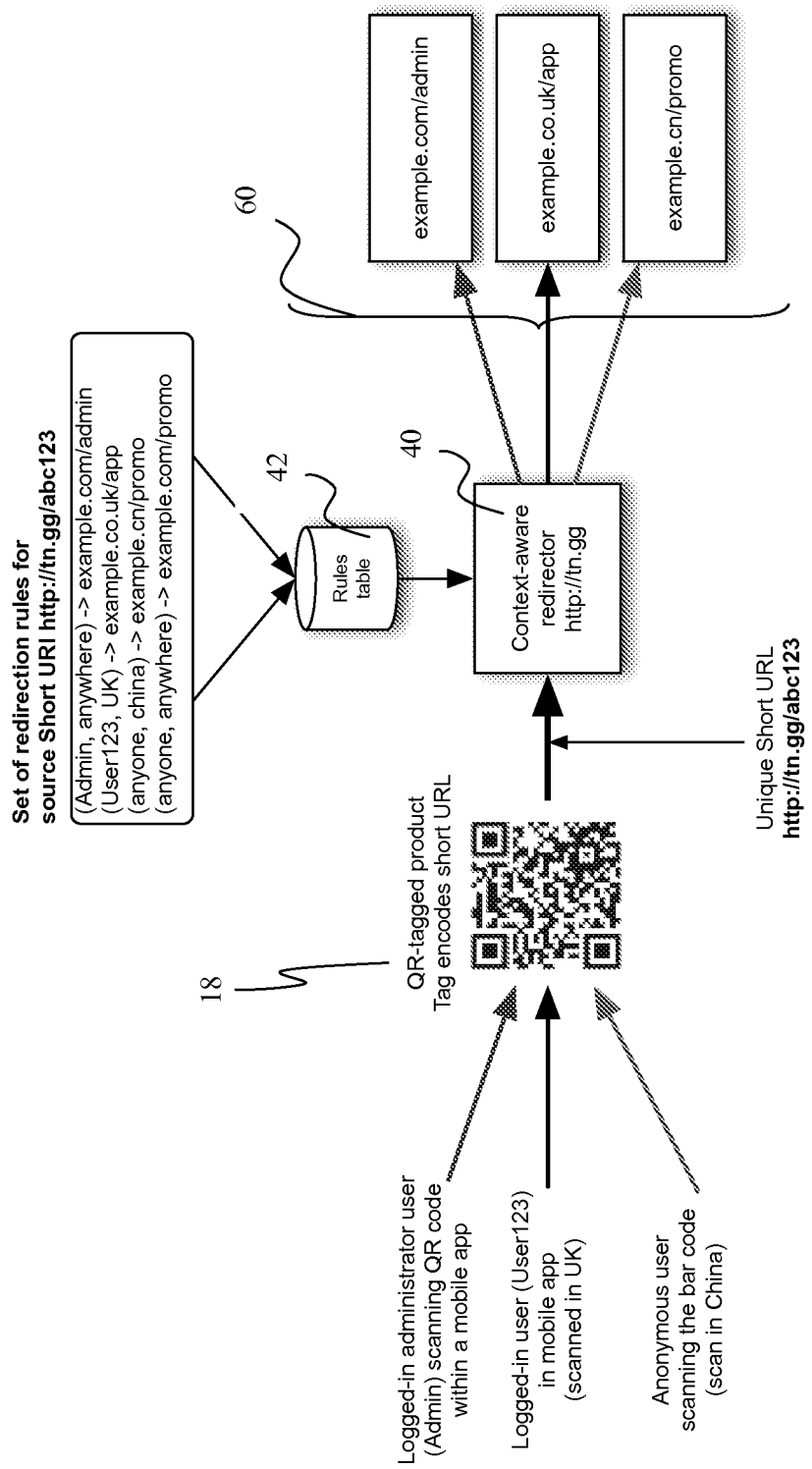
FIG. 4 illustrated a unique Auto-ID tag generated for a physical object, where the tag encodes a short URL that is mapped to a context-aware redirector server.

FIG. 4 illustrates how a unique Auto-ID tag is generated for each physical object, and the tag encodes a short URL that is mapped to a context-aware redirector. Though, in FIGS. 3 and 4, QR codes have been used, this was only used as an example. A person skilled in the art would appreciate that any kind of identifier and tags enabling to uniquely identify the object identifier and server address can be used.

As a further aspect of the invention, there is provided a tag for use with a physical object, the tag comprising a redirection identifier embodying a unique identifier of the object and an HTTP address of a server permitting to redirect or provide access to the user to a specific computer application about the object.

Preferably, the redirection identifier is a bar code. Preferably, the tag is an RFID tag or a NFC tag.

Figure 9:
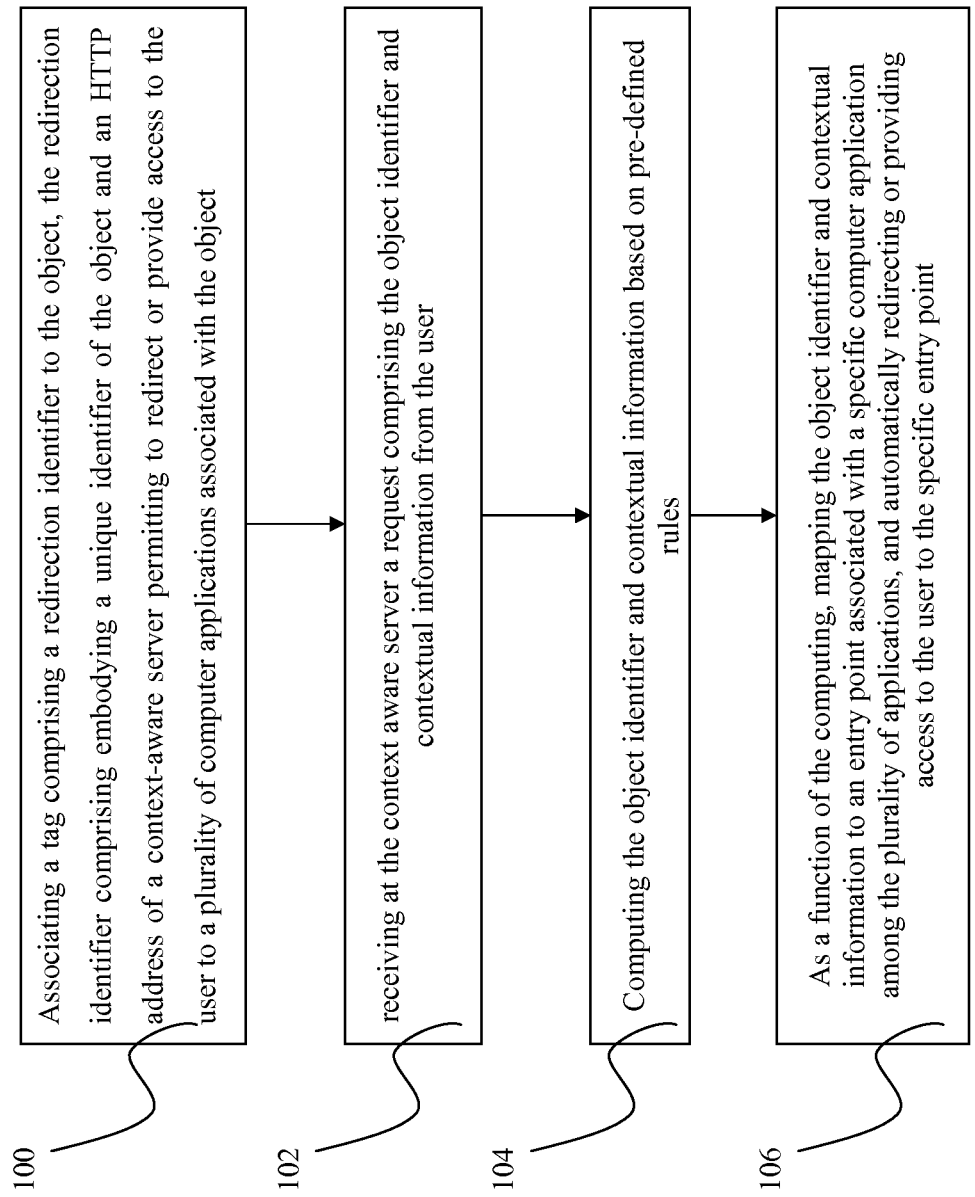
FIG. 9 illustrates a method for mapping tagged objects to context-aware applications in accordance with another embodiment of the present invention.

As another aspect of the invention, as illustrated in FIG. 9, there is provided a method of mapping tagged objects to context-aware applications, the method comprising:

associating a tag comprising a redirection identifier to the object, the redirection identifier comprising embodying a unique identifier of the object and an HTTP address of a context-aware server permitting to redirect or provide access to the user to a plurality of computer applications associated with the object (100);

receiving at the context aware server a request comprising the object identifier and contextual information from the user (102);

computing the object identifier and contextual information based on pre-defined rules (104); and as a function of the computing, mapping the object identifier and contextual information to an entry point associated with a specific computer application among the plurality of applications, and automatically redirecting or providing access to the user to the specific entry point (106).

Preferably, the context-aware server is remote from the tag, and the request is sent through a data network.

Preferably, the contextual information comprises at least one of the geographical location of the tag, the user's identify and the actual time the context-aware server received the request from the user device.

Alternative Embodiments

Figure 5:
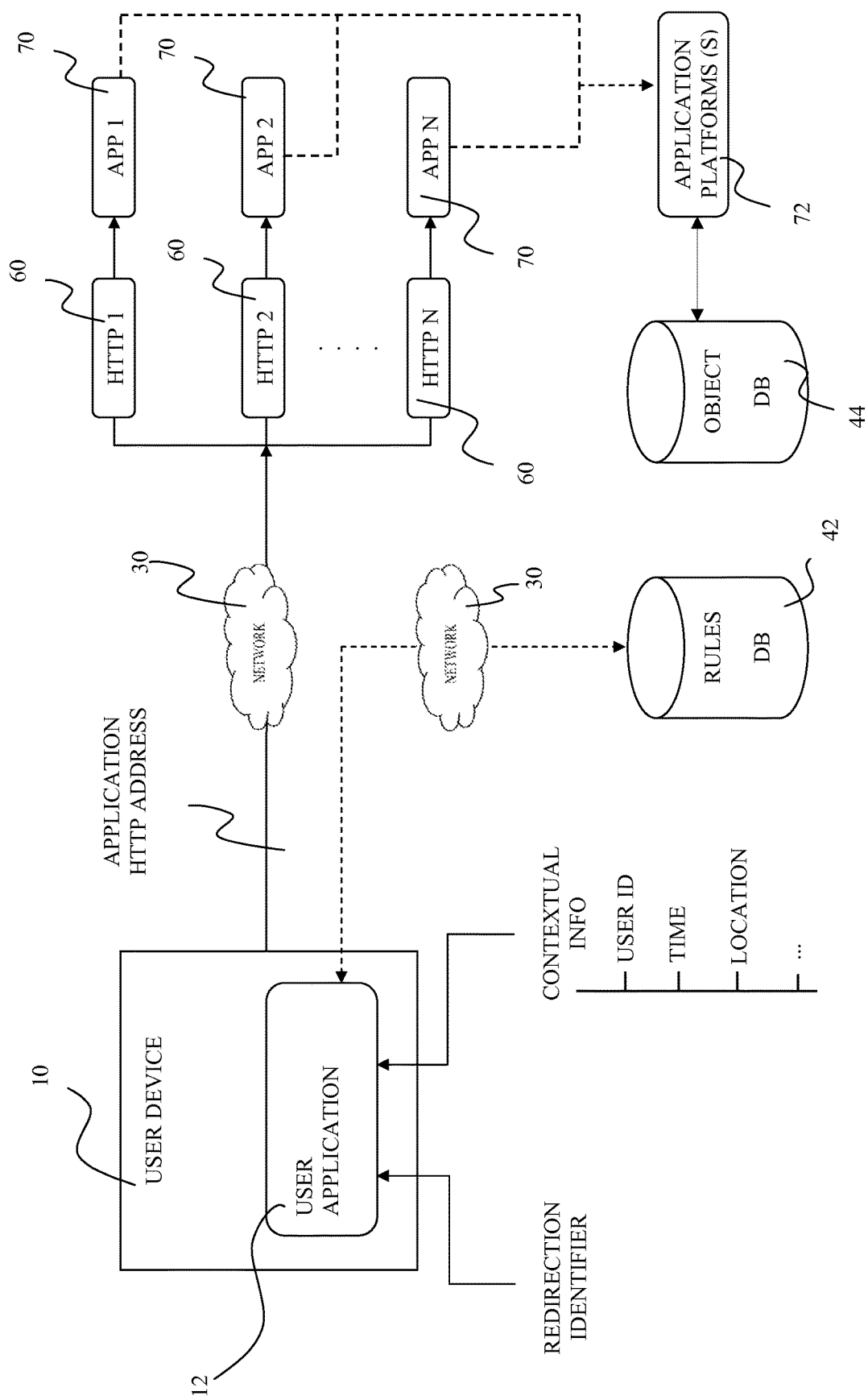
FIG. 5 illustrates a system for mapping tagged objects to context-aware applications in accordance with a second embodiment of the present invention.

According to another embodiment of the invention (see FIG. 5), the user bootstrap application located 12 on the user's device 10 is configured to automatically access the Rules DB 42 without passing by a context-aware redirector server (also called here proxy server) 40. This implies that the address of the Rules DB 42 is known by the local user application 12. The user application 12 is configured to capture the contextual information, including time, location and user identity associated with the request. The Rules DB 42 is preferably accessed remotely through a data network 30. The data network 30 can be any type of data network, including or a combination of the Internet, a mobile network, a satellite network or a local network.

The user application 12 sends a request comprising the object identifier and contextual information and the Rules DB which would directly return the HTTP Address 60 to the user application 12 that the user device 10 can access without passing by any proxy server 40. The HTTP addresses links to a specific application 70 hosted on an application platform 72. The application platform has access to the Object DB 44 to extract data associated with the object and relevant to the running of the application 65.

Figure 6:
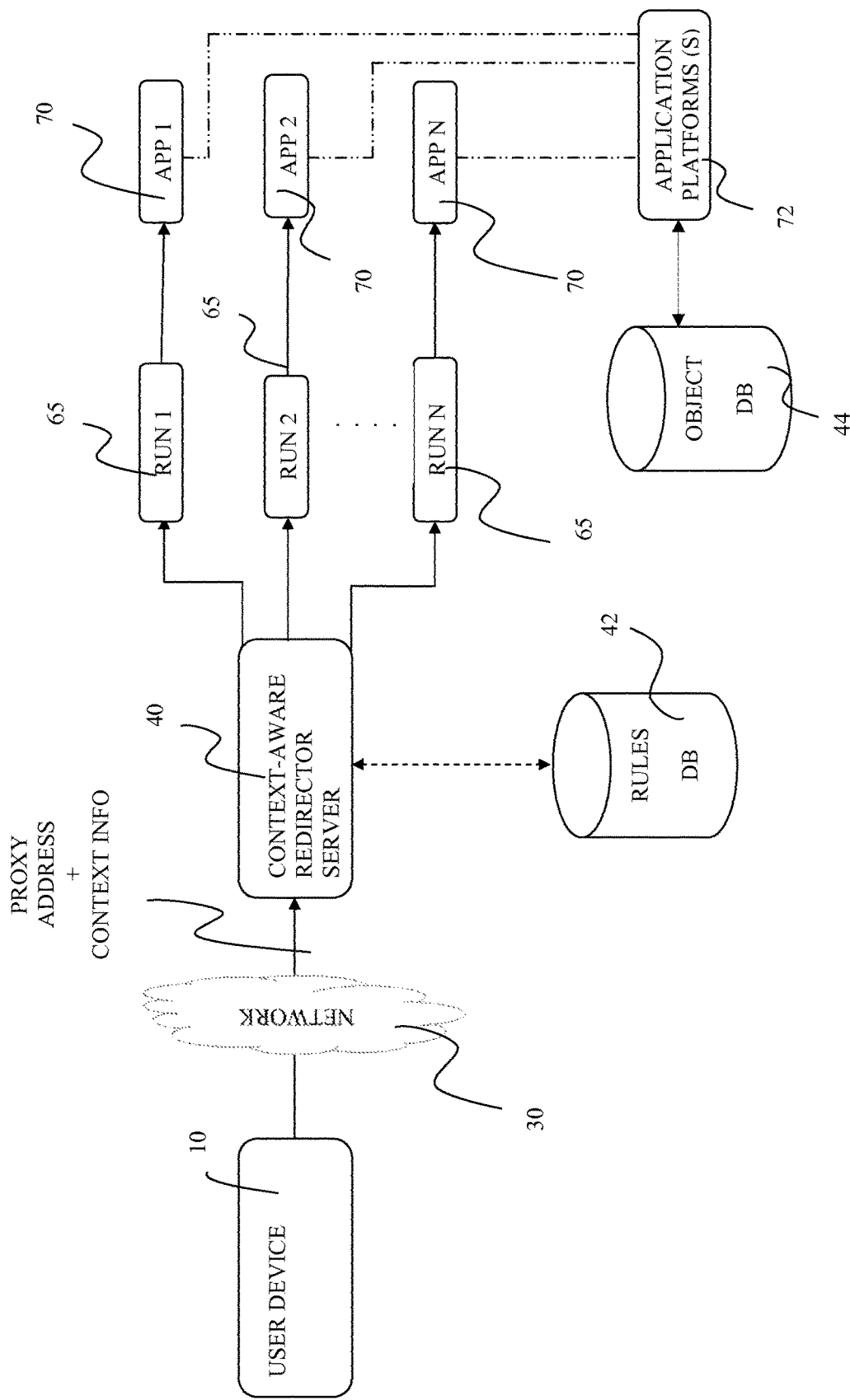
FIG. 6 illustrates a system for mapping tagged objects to context-aware applications in accordance with a third embodiment of the present invention.

According to further embodiment of the invention (see FIG. 6), entry point type use to access the applications is the executable file (RUN) 65 (rather than the HTTP). In this case, the Rules DB 42 would map the object identifiers and contextual information to executable files 65 (rather than HTPP addresses 60). Here, all the applications 70 located at application platforms 50 are triggered via their respective executable files 65.

Figure 7:
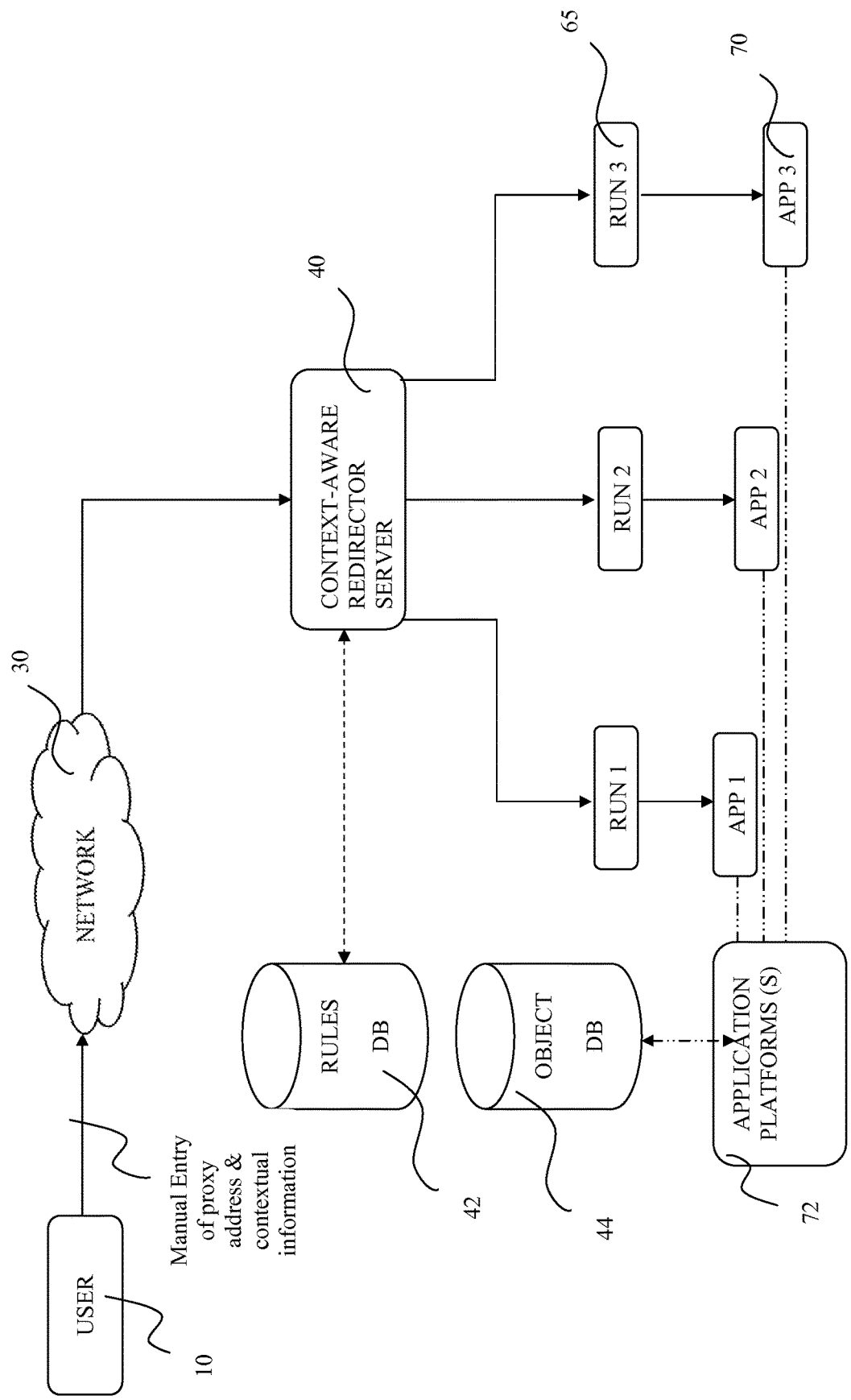
FIG. 7 illustrates a system for mapping tagged objects to context-aware applications in accordance with a fourth embodiment of the present invention.

According to a further embodiment of the present invention (see FIG. 7), the user application 12 is not required at the user device, where the user enters the object identifier manually via a user interface accessible to the context-aware redirector server 40 connected to the Rules DB 42. The contextual information can still be specified by the user manually or traced by the proxy server 40 by tracing the IP address of the user device 10 as explained above. The server would inquire the Rules DB using the object identifier and contextual information and return a corresponding executable file related to a specific application to trigger.

Figure 8:
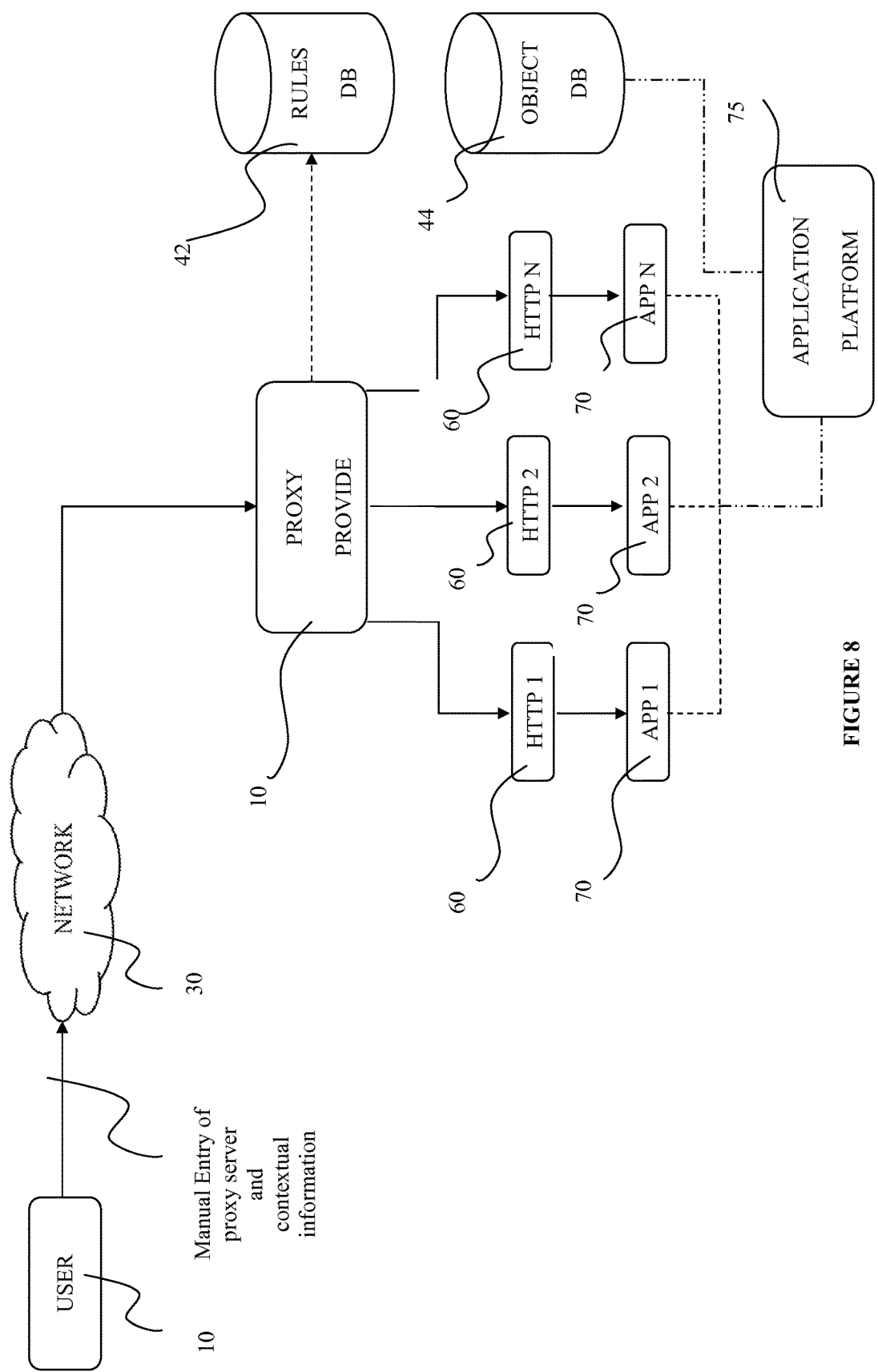
FIG. 8 illustrates a system for mapping tagged objects to context-aware applications in accordance with a fifth embodiment of the present invention.

According to another embodiment of the present invention (see FIG. 8), the object identifier is still entered manually by the user and processed as explained in embodiment 3 above, however in according with this embodiment, the entry points are HTTP addresses 60 and not executable files 65.

While the present invention has been described in details and with reference to specific embodiments thereof, it will be apparent to one skilled in the art that various additions, omissions and modifications can be made without departing from the spirit and scope thereof.

The invention claimed is:

1. A computer-implemented method, in a network comprising a plurality of objects, each of said objects having an object identifier associated therewith, each object comprising a tag, wherein the tag associated with each particular object in said network encodes: (i) said object identifier for said particular object, and (ii) an address or identifier resolvable to a location in said network, the method comprising:

(A) a context-aware redirection server maintaining in a rules database, a set of rules comprising, for each object identifier of a plurality of object identifiers, a corresponding mapping to a plurality of entry points for a corresponding plurality of independent computer applications;

(B) receiving, from a user device via a data network, and at said context-aware redirection server, a request comprising: (i) a particular object identifier, and (ii) contextual information from said user device, said context-aware redirection server and said particular object identifier having been determined from a specific object of said plurality of objects, said particular object identifier comprising an identifier associated with the specific object;

(C) determining, at said context-aware redirection server, a specific entry point of said plurality of entry points associated with said particular object identifier, said determining being based on: (i) the particular object identifier, and said contextual information associated with the request, and (ii) said set of rules in said rules database, said specific entry point corresponding to a specific computer application of said plurality of independent computer applications associated with said particular object, wherein said particular object identifier and said contextual information associated with the request are mapped by said set of rules to said specific entry point; and then (D) said context-aware redirection server redirecting said user device or providing said user device access to said specific computer application via said specific entry point.

2. The method as claimed in claim 1, wherein, for the particular object, the address or identifier resolvable to a location in said network comprises a redirection identifier associated with the particular object, and wherein the redirection identifier is at least one of a bar code and an alphanumeric code.

3. The method as claimed in claim 2, wherein the particular object identifier was determined from a tag associated with the particular object, and wherein said contextual information comprises at least one of the geographical location of the tag at the time of the request, the user's identity, and the actual time the request was received from the user device.

4. The method of claim 1 wherein the particular object identifier was determined from a tag associated with the particular object, and wherein said address or identifier associated with the particular object is resolvable to a server in said network, and wherein said request is received at said server remote from said tag, and said request is sent through a data network.

5. The method of claim 1 wherein said plurality of entry points comprise network addresses associated with said plurality of independent computer applications.

6. The method of claim 5 wherein said plurality of entry points comprise URIs corresponding to said plurality of independent computer applications.

7. The method of claim 6 wherein said specific entry point comprise a specific URI, and wherein said redirecting in (D) comprises redirecting said user device to specific URI.

8. The method of claim 6 wherein the specific entry point comprises a RUN.

9. The method of claim 1 wherein said contextual information associated with the request comprises information determined from the request.

10. The method of claim 9 wherein wherein said contextual information associated with the request further comprises information determined at the context-aware redirection server.

11. The method of claim 10 wherein said information determined at the context-aware redirection server comprises a time at which said request was received at the context-aware redirection server.

12. The method of claim 10 wherein the user's device access the server via a third party identity provider.

13. The method of claim 1 wherein said contextual information associated with the request comprises one or more of:

a geographical location of the user's device;
the user's identity; and
a time associated with receipt of the request.

14. The method of claim 13 wherein said contextual information associated with the request was determined, at least in part, using information stored on the user's device.

15. The method of claim 1 wherein said particular object identifier was determined from a tag associated with the particular object.

16. The method of claim 15, wherein the tag is selected from: an RFID tag, a bar code, a data matrix, an alphanumeric code, and an NFC tag.

17. The method of claim 16 wherein data are encoded in said tag using steganography.

18. The method of claim 15 wherein said tag encodes a redirection identifier associated with the particular object.

19. The method of claim 18 wherein said redirection identifier encodes said particular object identifier.

20. The method of claim 19 wherein said context-aware redirection server was determined based on said redirection identifier.

21. The method of claim 20 wherein said redirection identifier comprises a URI of said context-aware redirection server.

22. A computer-implemented method in a network comprising a plurality of objects, each of said objects comprising a tag, wherein the tag associated with each particular object in said network encodes: (i) a object identifier for said particular object, and (ii) an address or identifier resolvable to a location in said network, and wherein said object identifier for each said object is unique within the network, the method comprising:

(A) receiving, at a context-aware redirection server in said network, via a data network, and from a user device, a request comprising: (i) a particular object identifier, and (ii) contextual information, said particular object identifier and said context-aware redirection server having been determined from a particular object of said plurality of objects, said particular object identifier comprising a unique identifier associated with the particular object;

(B) determining, at said context-aware redirection server, a specific entry point of a plurality of entry points associated with said particular object identifier, said specific entry point corresponding to a specific computer application of a plurality of independent computer applications associated with said particular object, said determining being based on: (i) the particular object identifier, and (ii) said contextual information associated with the request, and (iii) pre-defined rules from a set of rules mapping object identifiers and contextual information to entry points and corresponding computer applications of said plurality of independent computer applications, said pre-defined rules being in a rules database operatively accessible by said context-aware redirection server; and (C) said context-aware redirection server redirecting said user device or providing said user device access to said specific computer application via said specific entry point.

23. The method of claim 22 wherein said plurality of entry points comprise network addresses associated with said plurality of independent computer applications, and wherein said determining in (B) associates the request with a target network address associated with the specific entry point.

24. The method of claim 23 wherein said specific entry point comprise a specific URI and wherein said redirecting in (C) comprises redirecting said user device to specific URI.

25. The method of claim 24 wherein said contextual information associated with the request comprises information determined by said context-aware redirection server from the request.

26. The method of claim 25 wherein said contextual information associated with the request further comprises information determined at the context-aware redirection server.

27. The method of claim 26 wherein said information determined at the context-aware redirection server comprises a time at which said request was received at the context-aware redirection server.

28. The method of claim 27 wherein the contextual information comprises at least one of: (i) a geographical location of the user device when the request was made; (ii) the user's identity; and (iii) the time at which said request was received at the context-aware redirection server.

29. An article of manufacture, comprising non-transitory computer-readable media having computer-executable instructions stored thereon, the instructions readable from the media by at least one processor on a server, and, when read and executed, for causing the at least one processor to:

(A) maintain in a rules database, a set of rules comprising, for each object identifier of a plurality of object identifiers, a corresponding mapping to a plurality of entry points for a corresponding plurality of independent computer applications, wherein each object identifier is associated with an object of a plurality of objects in a network, each of said plurality of objects having an object identifier associated therewith, each object of said plurality of objects comprising a tag, wherein the tag associated with each particular object in said network encodes: (i) said object identifier for said particular object, and (ii) an address or identifier resolvable to a location in said network;

(B) receive, at said server and via a data network and from a user device, a request comprising: (i) a particular object identifier, and (ii) contextual information from the user device, said particular object identifier and said server having been determined from a particular object of said plurality of objects, said particular object identifier comprising an identifier associated with the particular object;

(C) determine, at said server, a specific entry point of said plurality of entry points associated with said particular object identifier, said determining being based on: (i) the particular object identifier and contextual information associated with the request, and (ii) said set of rules in said rules database, said specific entry point corresponding to a specific computer application of said plurality of independent computer applications associated with said particular object, wherein said particular object identifier and said contextual information associated with the request are mapped by said set of rules to said specific entry point; and (D) redirect said user device or provide said user device access to said specific computer application via said specific entry point.

* * * * *